(12) United States Patent
Sridhar et al.

(10) Patent No.: US 9,597,966 B2
(45) Date of Patent: Mar. 21, 2017

(54) FUEL CELL SYSTEM FOR CHARGING AN ELECTRIC VEHICLE

(71) Applicant: Bloom Energy Corporation, Sunnyvale, CA (US)

(72) Inventors: K. R. Sridhar, Los Gatos, CA (US); Stuart Aaron, Los Altos, CA (US); Arne Ballantine, Palo Alto, CA (US); Peter Light, San Francisco, CA (US); Scott Reynolds, San Francisco, CA (US); Ramesh Srinivasan, Chennai (IN); Ranganathan Gurunathan, Chennai (IN)

(73) Assignee: BLOOM ENERGY CORPORATION, Sunnyvale, CA (US)

(*) Notice: Subject to any disclaimer, the term of this patent is extended or adjusted under 35 U.S.C. 154(b) by 470 days.

(21) Appl. No.: 14/064,783

(22) Filed: Oct. 28, 2013

(65) Prior Publication Data

US 2014/0049206 A1    Feb. 20, 2014

Related U.S. Application Data

(62) Division of application No. 12/379,310, filed on Feb. 18, 2009, now Pat. No. 8,624,549.

(Continued)

(51) Int. Cl.
 *B60L 11/18* (2006.01)
 *H01M 2/40* (2006.01)
 (Continued)

(52) U.S. Cl.
 CPC ....... *B60L 11/1811* (2013.01); *B60L 11/1816* (2013.01); *B60L 11/1824* (2013.01);
 (Continued)

(58) Field of Classification Search
 None
 See application file for complete search history.

(56) References Cited

U.S. PATENT DOCUMENTS 5,332,630 A  7/1994  Hsu
5,726,551 A  3/1998  Miyazaki et al.
(Continued)

FOREIGN PATENT DOCUMENTS

CN  1075033  8/1993
CN  1152813  6/1997
(Continued)

OTHER PUBLICATIONS

Office Action issued in counterpart Japanese Application No. 2010-547715, mailed on Apr. 30, 2014 (translation provided).

(Continued)

*Primary Examiner* — Sarah A Slifka
(74) *Attorney, Agent, or Firm* — The Marbury Law Group PLLC

(57) ABSTRACT

A method for charging electric vehicles includes receiving information regarding an electric vehicle. At least a portion of the information is received through a vehicle interface configured to place a battery of the electric vehicle into electrical communication with a fuel cell system. A charge is delivered from the fuel cell system to the battery of the electric vehicle through the vehicle interface without use of a direct current to alternating current (DC/AC) converter. The charge is delivered based at least in part on the information.

17 Claims, 2 Drawing Sheets

Related U.S. Application Data

(60) Provisional application No. 61/064,143, filed on Feb. 19, 2008.

(51) Int. Cl.

| | | |
|---|---|---|
| *H01M 8/04* | (2016.01) | |
| *H01M 16/00* | (2006.01) | |
| *H01M 10/625* | (2014.01) | |
| *H01M 10/615* | (2014.01) | |
| *H01M 10/637* | (2014.01) | |
| *H01M 10/654* | (2014.01) | |
| *H01M 10/6568* | (2014.01) | |
| *H01M 10/635* | (2014.01) | |
| *H01M 10/66* | (2014.01) | |
| *H01M 10/6561* | (2014.01) | |
| *H01M 10/613* | (2014.01) | |
| *H01M 10/44* | (2006.01) | |

(52) U.S. Cl.
CPC ....... *B60L 11/1881* (2013.01); *B60L 11/1892* (2013.01); *B60L 11/1894* (2013.01); *H01M 2/40* (2013.01); *H01M 8/0432* (2013.01); *H01M 8/04604* (2013.01); *H01M 8/04701* (2013.01); *H01M 8/04925* (2013.01); *H01M 10/613* (2015.04); *H01M 10/615* (2015.04); *H01M 10/625* (2015.04); *H01M 10/635* (2015.04); *H01M 10/637* (2015.04); *H01M 10/654* (2015.04); *H01M 10/6561* (2015.04); *H01M 10/6568* (2015.04); *H01M 10/66* (2015.04); *H01M 16/006* (2013.01); *B60L 2210/40* (2013.01); *B60L 2230/28* (2013.01); *H01M 10/44* (2013.01); *H01M 2250/10* (2013.01); *H01M 2250/20* (2013.01); *H01M 2250/405* (2013.01); *Y02B 90/14* (2013.01); *Y02B 90/16* (2013.01); *Y02E 60/50* (2013.01); *Y02T 10/7088* (2013.01); *Y02T 10/7241* (2013.01); *Y02T 90/121* (2013.01); *Y02T 90/127* (2013.01); *Y02T 90/14* (2013.01); *Y02T 90/16* (2013.01); *Y02T 90/32* (2013.01); *Y02T 90/34* (2013.01)

(56) References Cited

U.S. PATENT DOCUMENTS

| | | |
|---|---|---|
| 6,326,765 B1 | 12/2001 | Hughes et al. |
| 6,847,127 B1 | 1/2005 | Lee |
| 7,040,431 B2 | 5/2006 | Tartamella et al. |
| 7,045,238 B2 | 5/2006 | Gottmann et al. |
| 7,422,810 B2 | 9/2008 | Venkataraman et al. |
| 7,520,916 B2 | 4/2009 | McElroy et al. |
| 7,575,822 B2 | 8/2009 | Mitlitsky et al. |
| 7,705,490 B2 | 4/2010 | Srinivasan et al. |
| 8,232,676 B2 | 7/2012 | Gurunathan et al. |
| 2005/0257563 A1 | 11/2005 | Hoshi et al. |
| 2006/0191727 A1* | 8/2006 | Usami ............... B60K 25/00 180/65.245 |
| 2007/0196702 A1 | 8/2007 | Sridhar et al. |
| 2011/0071932 A1 | 3/2011 | Agassi et al. |

FOREIGN PATENT DOCUMENTS

| | | |
|---|---|---|
| CN | 1572037 A | 1/2005 |
| CN | 1985121 A | 6/2007 |
| EP | 1767845 A1 | 3/2007 |
| JP | 61-045574 A | 3/1986 |
| JP | 5-227669 | 9/1993 |
| JP | 06-225406 A | 8/1994 |
| JP | 07-303334 A | 11/1995 |
| JP | 08-33240 A | 2/1996 |
| JP | 08-115747 A | 5/1996 |
| JP | 09-019067 | 1/1997 |
| JP | 10-106867 A | 4/1998 |
| JP | 11-285109 A | 10/1999 |
| JP | 2000-341887 | 8/2000 |
| JP | 2001-8380 A | 1/2001 |
| JP | 2002-186194 A | 6/2002 |
| JP | 2002-231296 | 8/2002 |
| JP | 2003-333707 A | 11/2003 |
| JP | 2004-048895 | 2/2004 |
| JP | 2004-7969 A | 8/2004 |
| JP | 2006-074868 | 3/2006 |
| JP | 2007-288876 | 1/2007 |
| JP | 2007-143370 A | 6/2007 |

OTHER PUBLICATIONS

Office Action issued in counterpart Israeli Application No. 207645, mailed on Mar. 30, 2014 (translation provided).
International Search Report with Written Opinion dated Sep. 25, 2009 for International Patent Application No. PCT/US2009/034367.
International Preliminary Report on Patentability, Intl. Application PCT/US2009/034367. International Bureau of WIPO, Sep. 2, 2010.
Supplementary European Search Report, issued in European Patent Application No. EP09712742, mailed on Mar. 27, 2012.
Office Action issued in Chinese Patent Application No. 200980105333.8, mailed Aug. 3, 2012.
Office Action issued in counterpart Japanese Application No. 2010-547715, mailed on May 7, 2013.
Office Action issued in counterpart Chinese Application No. 200980105333.8, mailed on May 13, 2013.
Japanese Patent Office, Office Action dated Oct. 29, 2013, counterpart Japanese Application No. 2010-547715, 10 pgs.

* cited by examiner

FUEL CELL SYSTEM FOR CHARGING AN ELECTRIC VEHICLE

CROSS REFERENCE TO RELATED APPLICATIONS

The present application is a divisional of U.S. application Ser. No. 12/379,310, filed Feb. 18, 2009, now U.S. Pat. No. 8,624,549, which claims priority to U.S. Provisional Patent Application No. 61/064,143, filed on Feb. 19, 2008, the entire disclosure of which is incorporated herein by reference.

FIELD

The subject of the disclosure relates generally to a fuel cell system and a charging station for providing electricity. More specifically, the disclosure relates to a system and method for efficiently providing electrical power to an electric vehicle.

BACKGROUND

A fuel cell system can refer to a configuration of one or more fuel cells configured to produce a direct current (DC) signal. The individual fuel cells can be arranged in one or more fuel cell columns, each of which may contain one or more fuel cell stacks, such as solid oxide fuel cell stacks. A fuel cell stack can refer to a plurality of individual fuel cells which are electrically connected in series. The number of individual fuel cells which make up a given fuel cell system can depend on the amount of electrical power which the given fuel cell system is intended to generate. Alternatively, a fuel cell system may include any other configuration of individual fuel cells. Traditional fuel cell systems utilize a direct current to alternating current (DC/AC) converter to generate an AC signal for providing electricity to a building, a grid, an appliance, a lighting unit, a tool, a temperature control unit, a security system, a computing unit, etc. The DC/AC converter can be incorporated into the fuel cell system or remotely located, depending on the implementation.

SUMMARY

An illustrative method for charging vehicles is provided. The method includes receiving information regarding an electric vehicle. At least a portion of the information is received through a vehicle interface configured to place a battery of the electric vehicle into electrical communication with a fuel cell system. A charge is delivered from the fuel cell system to the battery of the electric vehicle through the vehicle interface without use of a direct current to alternating current (DC/AC) converter. The charge is delivered based at least in part on the information.

An illustrative charging station is also provided. The charging station includes a transactional unit, a vehicle interface, and a waste heat unit. The transactional unit is configured to receive information regarding an electric vehicle. The vehicle interface is configured to place a battery of the electric vehicle in electrical communication with a fuel cell system. The vehicle interface is also configured to deliver a charge from the fuel cell system to the battery of the electric vehicle. The waste heat unit is configured to deliver heat to the electric vehicle during at least a portion of delivery of the charge, where the heat comprises waste heat from the fuel cell system.

An illustrative fuel cell generator system is also provided. The fuel cell generator system includes a fuel cell system, a DC/DC converter, and a router. The fuel cell system is configured to generate a direct current (DC) signal. The DC/DC converter is configured to receive the DC signal from the fuel cell system and to convert the DC signal to a voltage of a battery of an electric vehicle. The router is configured to direct at least a portion of the converted DC signal from the DC/DC converter to a charging station for charging the electric vehicle.

Other principal features and advantages will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings.

DETAILED DESCRIPTION

The inventors have perceived that electric vehicles operate on direct current (DC) and that fuel cell systems provide a DC output (i.e., a DC power output). Thus, the inventors have perceived that it would be advantageous to utilize a fuel cell system in conjunction with a charging station to charge an electric vehicle. The DC output of the fuel cell system can be provided directly to the electric vehicle without conversion to an alternating current (AC) output or use of power conversion equipment. As such, the fuel cell system can be connected to the electric vehicle without utilizing a DC/AC converter to decrease system complexity and costs.

Figure 1:
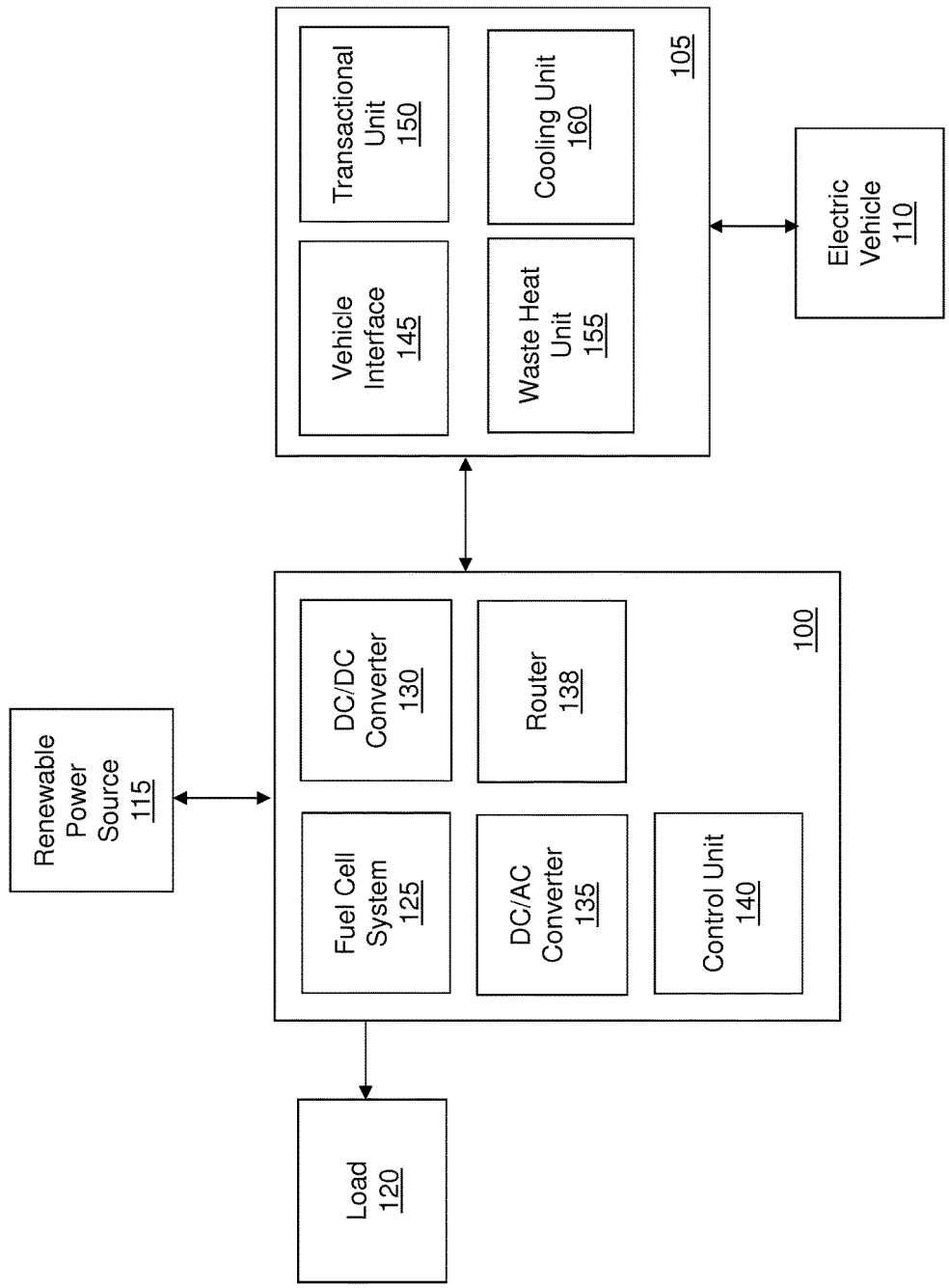
FIG. 1 is a block diagram illustrating a system for charging electric vehicles in accordance with an illustrative embodiment.

FIG. 1 is a block diagram illustrating a system for charging electric vehicles in accordance with an illustrative embodiment. The system includes a fuel cell generator system 100, a charging station 105, an electric vehicle 110, a renewable power source 115, and a load 120. In alternative embodiments, the system may include additional, fewer, and/or different components. In an illustrative embodiment, electric vehicle 110 can access and utilize charging station 105 to charge one or more electric batteries that are used to power electric vehicle 110. In one embodiment, the electricity used to charge the one or more electric batteries can be generated by fuel cell generator system 100.

Fuel cell generator system 100 includes a fuel cell system 125, a DC/DC converter 130, a DC/AC converter 135, a router 138, and a control unit 140. In alternative embodiments, fuel cell generator system 100 may include additional, fewer, and/or different components. In another alternative embodiment, DC/DC converter 130 may be incorporated into charging station 105. Fuel cell generator system 100 can be utilized to provide electricity to a plurality of charging stations or to a single charging station, depending on the embodiment.

Fuel cell system 125 can be a solid oxide fuel cell system, a polymer electrolyte membrane (PEM) fuel cell system, a molten carbonate fuel cell system, or any other type of fuel cell system known to those of skill in the art. Fuel cell system 125 can include a plurality of individual fuel cells arranged in any configuration known to those of skill in the art. For example, fuel cell system 125 may include one or more fuel cell stacks, one or more fuel cell columns, etc. In one embodiment, fuel cell system 125 can be a solid oxide fuel cell system as described in U.S. Pat. No. 7,045,238, U.S. patent application Ser. No. 10/653,240 (published as U.S. Patent Application Publication No. 2005/0048334), U.S. patent application Ser. No. 10/866,238 (published as U.S. Patent Application Publication No. 2004/0224193), and/or U.S. patent application Ser. No. 11/002,681 (published as U.S. Patent Application Publication No. 2005/0164051), all of which are incorporated herein by reference in their entirety.

Fuel cell system 125 can generate electricity according to any method known to those of skill in the art. In an illustrative embodiment, the electricity generated by fuel cell system 125 can be conveyed to a load such as electric vehicle 110 or load 120 using a split (or middle) bus configuration. The split bus configuration can include a positive bus, a negative bus, and a neutral bus. An illustrative split bus configuration is described in more detail in U.S. patent application Ser. No. 12/149,488 titled Uninterruptible Fuel Cell System and filed on May 2, 2008, the disclosure of which is incorporated herein by reference in its entirety. In an illustrative embodiment, the split bus can be configured to provide a voltage of 400 volts (V). Alternatively, any other voltage value may be provided. In another alternative embodiment, a single bus or any other bus configuration may be used to convey the electricity generated by fuel cell system 125.

Direct current to direct current (DC/DC) converter 130 can be any device configured to increase or decrease a DC voltage generated by fuel cell system 125. Direct current to direct current converter 130 can be powered by the split (or other) bus of fuel cell system 125. Charging station 105 can be electrically connected to DC/DC converter 130 and can receive an output from DC/DC converter 130. In an alternative embodiment, DC/DC converter 130 may not be included in fuel cell generator system 100. In such an embodiment, DC voltage conversion can be performed by a vehicle interface 145 of charging station 105. In another alternative embodiment, DC/DC converter 130 can be used in conjunction with vehicle interface 145 to perform DC voltage conversion. Vehicle interface 145 is described in more detail below with reference to charging station 105. In one embodiment, an output of DC/DC converter 130 can be provided to router 138 for provision to charging station 105 and/or load 120.

In an illustrative embodiment, an output of DC/DC converter 130 can be adjustable to allow charging of a plurality of batteries with different voltage ratings. For example, an output of DC/DC converter 130 can have an adjustable range of between 0 volts (V) and 400 V to accommodate different batteries. Alternatively, any other range(s) may be used. In an alternative embodiment, a plurality of DC/DC converters may be used to improve operating efficiency. For example, a first DC/DC converter may provide an adjustable output from 100 V to 199 V, a second DC/DC converter may provide an adjustable output from 200 V to 299 V, a third DC/DC converter may provide an adjustable output from 300 V to 399 V, and so on. Alternatively, any other number of DC/DC converters and/or voltage ranges may be used.

In one embodiment, DC/DC converter 130 can be bi-directional. In such an embodiment, power from the one or more batteries of electric vehicle 110 can be received by DC/DC converter 130 for use in charging a second electric vehicle (not shown). The power from the one or more batteries of electric vehicle 110 can also be received by DC/DC converter 130 for powering load 120. Load 120 can be an electrical grid, a building, a peripheral device of fuel cell system 125 (such as a light, blower, fan, etc.), or any other consumer of electrical power. If load 120 is an alternating current (AC) load, the power from the one or more batteries can be provided to DC/AC converter 135 for conversion to an AC signal. If load 120 is a DC load, power from the one or more batteries can be provided directly from DC/DC converter 130 to load 120. If load 120 is a DC load, DC/AC converter 135 may not be included in fuel cell generator system 100.

If DC/DC converter 130 is bi-directional, power from the one or more batteries of electric vehicle 110 can also be used by fuel cell system 125 to mitigate the effect of electrical load step changes (such as a motor start transient) on fuel cell system 125. In such an embodiment, renewable power source 115 may not be used. If DC/DC converter 130 is not bi-directional, renewable power source 115 may be utilized to mitigate the effect of such load step changes on fuel cell system 125. Renewable power source 115 can include one or more batteries, one or more super capacitors, one or more solar cells, an electric grid, a geothermal unit, a thermovoltaic subsystem, a thermophotovoltaic subsystem, and/or any other devices configured to generate and/or store electricity. Renewable power source 115 may be physically integrated with fuel cell system 125 (i.e., mounted on a casing thereof), or remotely located from fuel cell system 125, depending on the embodiment. In an illustrative embodiment, an owner of electric vehicle 110 can be paid in return for use of his/her battery. The payment can be in the form of a spinning reserve credit, a direct credit, cash, etc.

Router 138 can be used to direct power from fuel cell system 125 to charging station 105 and/or to load 120. Router 138 can also be used to direct power from renewable power source 115 to charging station 105 and/or to load 120. If fuel cell system 125 is a reversible fuel cell system, router 138 can also cause renewable power source 115 to provide power to fuel cell system 125 when fuel cell system 125 operates in a charge mode or an electrolysis mode. Router 138 can be a power router that may be computer-controlled, software-controlled, and/or hardware-controlled. Depending on the embodiment, router 138 can be positioned inside or outside of a casing of fuel cell system 125. In an alternative embodiment, router 138 may not be included.

Control unit 140 can be used to control the interaction between the components of fuel cell generator system 100. Control unit 140 can also use router 138 to control an amount of power distributed to electric vehicle 110, an amount of power distributed to load 120, an amount of power received from electric vehicle 110, and an amount of power received from renewable power source 115. In one embodiment, control unit 140 can determine whether charging power is to be provided from fuel cell system 125 or renewable power source 115. The determination can be made based on a time of day, an ambient temperature, a price of fuel used by fuel cell system 125, availability of power from fuel cell system 125, availability of power from renewable power source 115, etc. Similar factors can also be used to determine an amount and source of power to be provided to load 120. In another embodiment, control unit 140 can be in communication with a transactional unit 150 of charging station 105 to control the amount of power distributed to or received from electric vehicle 110. Control unit 140 can include a memory, a processor, and a user interface. The memory can be used to store computer-readable instructions which, upon execution by the processor, cause fuel cell generator system 100 to perform the operations described herein. The user interface can allow a user to control, program, and/or override control unit 140. Alternatively, at least a portion of control unit 140 may be circuit based.

Electric vehicle 110 can be a land-based vehicle such as a car, truck, sports utility vehicle (SUV), bus, train, motorcycle, all-terrain vehicle, snowmobile, tractor, lawnmower, moped, etc. Electric vehicle 110 may also be a water-based vehicle such as a boat, jet ski, etc., or an air-based vehicle such as an airplane, glider, etc. Electric vehicle 110 may also be a hybrid vehicle with external charging capability or a strictly electric vehicle. Electric vehicle 110 can operate at least in part by utilizing an electrical charge stored in a storage device such as one or more batteries. The one or more batteries can be lead-acid batteries, nickel cadmium batteries, nickel metal hydride batteries, lithium ion batteries, lithium ion polymer batteries, zinc air batteries, molten salt batteries, and/or any other type of electric vehicle battery known to those of skill in the art. In one embodiment, electric vehicle 110 may include a flow battery or other liquid electrolyte battery.

Electric vehicle 110 can be taken to charging station 105 for charging the one or more batteries. Charging station 105 can also be used to store electric vehicle 110 and/or maintain a charge on the one or more batteries of electric vehicle 110. Charging station 105 can be a stall, parking spot, or other area in which electric vehicle 110 can be taken to re-charge the one or more batteries of electric vehicle 110. For example, charging station 105 may be a parking spot located in a parking lot. In one embodiment, charging station 105 may be associated with an electricity service station that operates similar to a gas station. Alternatively, charging station 105 may be within an employee parking lot, a grocery store parking lot, a movie theater parking lot, a sporting event parking lot, an on-street parking spot, a garage, a docking area, and/or any other location in which electric vehicle 110 may be parked. Charging station 105 can include a cement slab or other structure/area on which electric vehicle 110 may be parked. Further, charging station 105 can be enclosed or partially enclosed. As an example, charging station 105 can include brush curtains or other side walls to help shelter electric vehicle 110 from the ambient environment. Charging station 105 may also include a roof or other overhead structure to shelter electric vehicle 110 from precipitation. Alternatively, charging station 105 may have any other configuration.

Charging station 105 also includes vehicle interface 145, transaction unit 150, a waste heat unit 155, and a cooling unit 160. Fuel cell generator system 100 can be coupled to electric vehicle 110 via vehicle interface 145 of charging station 105. Vehicle interface 145 can be any interface through which electric vehicle 110 is placed in electrical communication with fuel cell generator system 100 such that the one or more batteries of electric vehicle 110 can be charged. As used herein, electrical communication can refer to any direct or indirect electrical connection. In one embodiment, vehicle interface 145 can be a standard or custom electrical socket/outlet (or plug). In such an embodiment, electric vehicle 110 can be equipped with an electrical plug (or socket/outlet) configured to couple with the electrical socket/outlet (or plug). Vehicle interface 145 may also be in the form of one or more battery clamps configured to be connected to one or more charging terminals of electric vehicle 110.

In one embodiment, vehicle interface 145 can include at least a primary winding of a transformer (or DC/DC converter). In such an embodiment, electric vehicle 110 can include a secondary winding of the transformer. The transformer can be formed as a paddle such that the primary winding and the secondary winding can be placed in electrical communication without direct contact. To connect electric vehicle 110 to the transformer, a paddle that houses the primary winding can be mounted to a paddle that houses the secondary winding. Inductive coupling can be used to link the primary winding and the secondary winding such that electricity is conveyed to electric vehicle 110. As such, the primary winding and the secondary winding can be in electrical communication without direct contact. In such an embodiment, many different electric battery voltages can be accommodated because each electric vehicle can have a unique secondary winding configured to deliver a specific voltage corresponding to a specific battery. Use of a transformer with inductive coupling can also provide a safety feature in that high voltage connections are entirely insulated via the paddle configuration.

In one embodiment, electric vehicle 110 can include a rectifier. The rectifier can be used to convert alternating current (AC) into direct current for home charging of the vehicle through a standard AC power outlet. The rectifier can also be configured to pass DC power to the one or more batteries of electric vehicle 110. In such an embodiment, vehicle interface 145 can include a plug, socket, clamp, wire, or any other component which is configured to place the rectifier of electric vehicle 110 in electrical communication with fuel cell generator system 100.

Transactional unit 150 can include a processor, a memory, and a user interface. Transactional unit 150 can be used to identify information regarding electric vehicle 110 and/or an owner of electric vehicle 110, to determine an amount due for charging electric vehicle 110, and/or to receive payment from the owner of electric vehicle 110. The identified information can be stored in the memory of transactional unit 150 for use in future transactions. The user interface can be used by the owner of electric vehicle 110 to provide identification, enter vehicle information, provide instruction, provide payment, enter timing information, etc. The processor of transactional unit 150 can be used to control vehicle interface 145, waste heat unit 155, and/or cooling unit 160. In an alternative embodiment, a separate control unit may be utilized to control the interaction of components in charging station 105.

The information identified by transaction unit 150 and regarding electric vehicle 110 can include a type of battery(s) included in electric vehicle 110, a condition or health of the battery(s) in electric vehicle 110, any temperature restrictions regarding the battery(s) in electric vehicle 110, any charging rate restrictions for the battery(s) in electric vehicle 110, and/or an amount of charge residing on the battery(s) in electric vehicle 110. This information can be received by analyzing the battery(s) through vehicle interface 145, from a website of a manufacturer of electric vehicle 110, from stored literature regarding electric vehicle 110, from inputs received through the user interface, etc.

The information identified by transactional unit 150 can also include a distance that the owner of electric vehicle 110 plans to drive prior to recharging, a destination of the driver, a desired arrival time to the destination, a route to the destination, etc. The distance, destination, desired arrival time, and/or route can be used to determine how much charge is needed by the electric battery and/or a charging schedule for the battery. The information can also include an amount of time that the owner can allow electric vehicle 110 to charge, which can be used to determine a rate at which the battery is charged. The information can further include whether the owner grants the system permission to use any stored power in the battery(s) of electric vehicle 110. Transactional unit 150 can use the identified information to determine a voltage at which to charge the battery(s), a rate at which to charge the battery(s), and an amount of payment due for charging the batteries. Transactional unit 150 can also use the identified information and the ambient temperature to determine whether the battery(s) of electric vehicle 110 should be heated or cooled during charging. As known to those of skill in the art, charging or discharging an electric car battery at temperatures of 0 degrees Fahrenheit (F) and below can severely impact battery lifetime. As such, it may be desirable to keep the battery(s) warm when charging at low temperatures. It is also well known that $I^2*R$ heating can occur when charging a battery, where I is the charging current and R is the internal resistance of the battery. As such, it may be desirable to keep the battery(s) cool when charging at high temperatures. If it is determined that climate control is desirable, transactional unit 150 can cause waste heat unit 155 to heat the battery(s) or cooling unit 160 to cool the battery(s).

Waste heat unit 155 can utilize waste heat from fuel cell system 125 to heat at least the battery(s) of electric vehicle 110. The waste heat can be obtained from an anode or cathode exhaust system of fuel cell system 125, from heat radiated off the fuel cells of fuel cell system 125, etc. In one embodiment, waste heat unit 155 can include one or more fans or blowers to circulate the waste heat under electric vehicle 110 to keep the battery(s) warm. Alternatively, the waste heat can be directed under electric vehicle 110 by circulating heated fluid in the pavement or other surface upon which electric vehicle 110 is parked. Brush curtains, walls, a ceiling, and/or any other structure of charging station 105 can be used to prevent heat loss and to help keep electric vehicle 110 warm. In one embodiment, the waste heat may also be delivered via the heating/cooling system of electric vehicle 110. In such an embodiment, the waste heat can be delivered to electric vehicle 110 via heated air and the blowers/pumps of the heating/cooling system can be activated by waste heat unit 155 to circulate the heated air throughout electric vehicle 110. If electric vehicle 110 includes a flow battery or other liquid electrolyte battery, waste heat unit 155 can pump the liquid electrolyte from the battery, place the liquid electrolyte into contact with the waste heat, and circulate the heated liquid electrolyte back into the battery.

Waste heat unit 155 can also be configured to warm up electric vehicle 110 at a predetermined time. For example, charging station 105 may be in a parking lot where an owner of electric vehicle 110 works. Transactional unit 150 may know (based on user input or pattern recognition) that the owner goes out for lunch at 12:00 pm every day and gets done with work at 5:00 pm every day. As such, transactional unit 150 can cause waste heat unit 155 to heat electric vehicle 110 several minutes (i.e., 5-10 minutes) prior to 12:00 pm and 5:00 pm every day such that electric vehicle 110 is warm when the owner gets behind the wheel. Similarly, charging station 105 may be located at a grocery store parking lot. Transaction unit 150 and/or waste heat unit 155 can receive checkout information from a checkout system of the grocery store. As such, waste heat unit 155 can be used to heat electric vehicle 110 upon an indication that the owner is at the checkout register. The determination regarding whether or how much to heat electric vehicle 110 can also be based at least in part on the ambient outside temperature.

Cooling unit 160 can be used by transactional unit 150 to keep the battery(s) of electric vehicle cool if the ambient temperature is high. In one embodiment, cooling unit 160 can directly operate battery cooling fans of electric vehicle 110 to improve charging conditions. Cooling unit 160 can also use one or more external fans and/or blowers to circulate air within the battery compartment to aid in cooling. If electric vehicle 110 includes an electric type air conditioning (A/C) unit, cooling unit 160 can directly operate the A/C system during charging to aid in cooling and/or to keep the owner of electric vehicle 110 comfortable if he/she remains in electric vehicle 110 during charging. Alternatively, fuel cell generator system 100 may generate cool air in large scale using an A/C or other cooling unit. The cool air could be blown directly onto and/or into electric vehicle 110 using a coaxial wiring connection. As an example, a center (or inside portion) of the coaxial wiring connection can include wiring for electrically connecting cooling unit 160 to the A/C unit or other component of electric vehicle 110, and an outside portion (or periphery) of the coaxial wiring connection can be a tube for conveying cool air to electric vehicle 110. Alternatively, any other configuration may be used to convey the cool air or other cooled fluid. Cooling unit 160 can also be used to cool electric vehicle 110 at a predetermined time (i.e., just before the owner is ready to leave work for the day, upon an indication that the owner is at the checkout register of a store, etc.)

Transactional unit 150 can also be used to determine an amount due for charging electric vehicle 110. In one embodiment, transactional unit 150 can generate a cost model to determine a charging cost. The cost model can be based on various factors, including fuel costs for operating fuel cell system 125, grid electricity costs, other costs associated with running and/or maintaining fuel cell system 125, carbon dioxide ($CO_2$) taxes and credits, an expected driving distance before a subsequent re-charge of the battery, customer priority, an amount of charge required by the customer, battery health, a requested rate of charge (i.e., fast or slow), whether electric vehicle 110 is to be heated or cooled during the charging, etc.

Transactional unit 150 can also receive payment from the owner of electric vehicle 110 and finalize the charging transaction. Payment can be made through credit card, debit card, cash, or any other method. Finalizing the transaction can include providing a receipt with transaction information to the owner of electric vehicle 110. The transaction information can include a date of the transaction, an amount of charge provided, a cost for charging, a cost for heating or cooling provided, $CO_2$ tax/credit information, an amount of credit for use of the battery during charging, customer status (i.e., frequent customer, preferred customer, etc.), customer benefits information such as a discount or points awarded, payment information, battery status, and/or any other information. In addition to the customer, the transaction information can also be provided to the site operator (i.e., the entity that provided the charging service), the owner or operator of fuel cell generator system 100 (if the owner/operator is not the same as the site operator), and/or the vehicle manufacturer. The vehicle manufacturer can use the transaction information to determine whether the battery(s) of electric vehicle 110 should be serviced or replaced.

In an alternative embodiment, any or all of vehicle interface 145, transactional unit 150, waste heat unit 155, and cooling unit 160 may be incorporated into fuel cell generator system 100. In such an embodiment, charging station 105 can simply be a surface and/or structure upon which electric vehicle 110 is placed in order to interact with fuel cell generator system 100. In another alternative embodiment, any of the described components of fuel cell generator system 100 and/or charging station 105 may be combined into one or more single units. In another alternative embodiment, charging station 105 may also include a renewable or alternative power source which can be utilized to charge electric vehicle 110 in the event of a problem with fuel cell system 125 and renewable power source 115.

Figure 2:
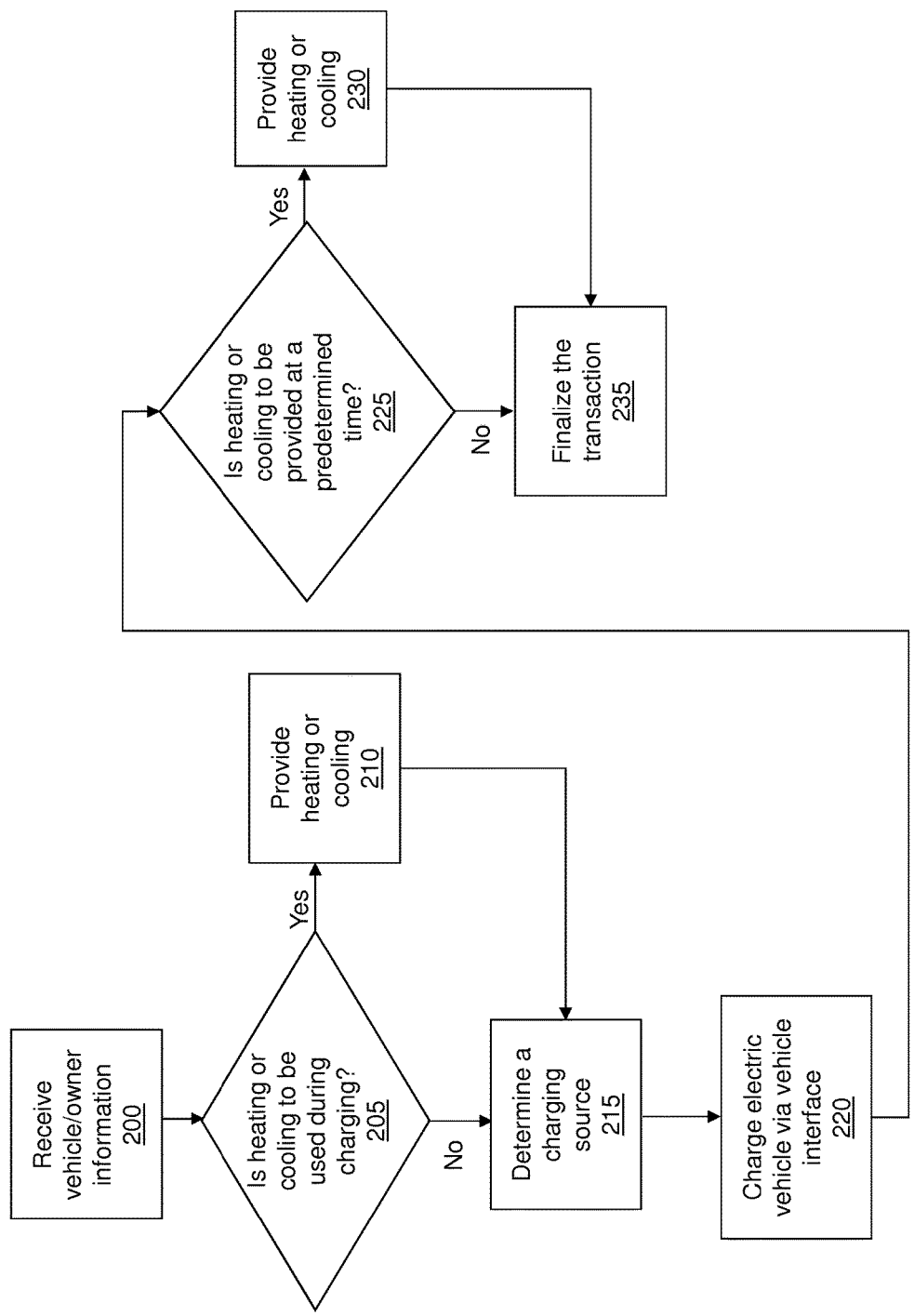
FIG. 2 is a flow chart illustrating operations performed by a system for charging an electric vehicle in accordance with an illustrative embodiment.

FIG. 2 is a flow chart illustrating operations performed by a system for charging an electric vehicle in accordance with an illustrative embodiment. In alternative embodiments, additional, fewer, and/or different operations may be performed. Further, the use of a flow diagram is not meant to be limiting with respect to the order of operations performed. In an operation 200, the system receives electric vehicle information and/or information regarding an owner (or driver) of electric vehicle. The electric vehicle, which may be electric vehicle 110 described with reference to FIG. 1, can be located in a charging station such as charging station 105 described with reference to FIG. 1.

The received information can include any information which may be utilized to charge the electric vehicle. For example, the received information may include a type of the electric vehicle, a type of battery in the electric vehicle, a voltage of the battery in the electric vehicle, temperature ratings and/or restrictions for charging the battery in the electric vehicle, a battery status or health, a desired or mandated charging rate of the battery in the electric vehicle, a time at which the owner (or driver) plans to return to the vehicle, etc. The information can be received from the owner (or driver) of the electric vehicle through one or more user inputs, from the electric vehicle through a vehicle interface connected to the electric vehicle, from a website of a manufacturer of the electric vehicle, from stored literature, from stored information regarding a prior transaction, and/or from any other source.

In one embodiment, the received information can include a destination to which the driver of the electric vehicle intends to travel, a route to the destination, and/or a desired arrival time at the destination. The destination, route, and/or desired arrival time may be received from the electric vehicle, from the driver of the electric vehicle, from a global positioning system (GPS) of the electric vehicle, from scheduling software or a scheduling website associated with the driver, from mapping software or a mapping website such as Google Maps, MapQuest, Yahoo! Maps, etc., and/or from any other source. The system and/or the electric vehicle can use the destination, the route, and/or the desired arrival time to ensure that the battery(s) of the electric vehicle have sufficient charge to reach the destination along the route at the desired arrival time. The system and/or the electric vehicle can also determine an appropriate charging schedule for the electric vehicle based on the determined charge that is to be provided to the battery(s).

As an example, the electric vehicle may determine an amount of charge that is desired and a time at which charging is to be completed based on a destination, a route, and/or a time at which the driver is supposed to be at the destination. The electric vehicle may receive the destination and the arrival time from an electronic calendar of the driver. The route can be received from a mapping website, from mapping software, from a GPS system, etc. Alternatively, the destination, route, and/or desired arrival time may be received from the driver through manual entry, from a calendaring/scheduling website, from a GPS system, from a mapping website and/or mapping software, etc. The electric vehicle can determine the desired charge and desired departure time for provision to the system. Based on the received information, the system can determine an appropriate charging schedule. Alternatively, the electric vehicle may determine the appropriate charging schedule. In another alternative embodiment, the system may receive the destination, the route, and/or the arrival time from the electric vehicle and/or any of the other sources described above. In such an embodiment, the system can determine the desired charge, the desired departure time, and/or an appropriate charging schedule.

In an operation 205, the system determines whether heating or cooling is to be used during charging. The determination can be made based at least in part on an ambient temperature of the charging station in which the electric vehicle is located. The determination can also be made based at least in part on a temperature rating of the battery in the electric vehicle. If it is determined that heating or cooling is to be used, the system provides the heating or the cooling in an operation 210. In an illustrative embodiment, the heating can be provided according to any of the methods described above with reference waste heat unit 155. Alternatively, any other heating source and/or method may be used. Similarly, the cooling can be provided according to any of the methods described above with reference to cooling unit 160. Alternatively, any other cooling method may be used.

Upon provision of heating or cooling, or if it is determined in operation 205 that heating and cooling are not to be used, a charging source is determined in an operation 215. In an illustrative embodiment, the charging source can be a fuel cell system such as fuel cell system 125 described with reference to FIG. 1. Alternatively, a renewable power source (such as renewable power source 115) in electrical communication with the fuel cell system may be used. A separate power source associated with the charging station may also be used. The determination regarding which source to use can be based on factors such as a time of day, an ambient temperature, a price of fuel used by the fuel cell system, availability of power from the fuel cell system, availability of power from the renewable power source, etc.

In an operation 220, the electric vehicle is charged through a vehicle interface such as vehicle interface 145 described with reference to FIG. 1. The electric vehicle can be charged through a two-piece paddle transformer as described above, through a rectifier of the electric vehicle, through a plug and socket configuration, through a battery clamp configuration, and/or by any other method.

In an operation 225, the system determines whether heating or cooling is to be provided at a predetermined time. The predetermined time can be several minutes prior a return of the driver to the electric vehicle, and can be determined based on the information received in operation 200. Alternatively, the predetermined time can be based on information received from a store checkout system or other external source. The determination can also be based at least in part on an ambient temperature of the charging station and/or an ambient temperature outside of the charging station. If it is determined that heating or cooling is to be provided, the heating or cooling can be provided at the predetermined time in an operation 230. In an illustrative embodiment, the heating or cooling can be provided according to any of the methods described above with reference to waste heat unit 155 and cooling unit 160 of FIG. 1. Alternatively, any other heating and/or cooling method may be used.

Upon provision of heating or cooling, or if it is determined in operation 225 that heating and cooling are not to be used, the transaction is finalized in an operation 235.

Finalizing the transaction can include determining a cost for the charging service, receiving payment for the charging service, and/or providing a receipt with transaction information to the owner (or driver) of the electric vehicle. The transaction information can include a date of the transaction, an amount of charge provided, a cost for charging, a cost for heating or cooling provided, $CO_2$ tax/credit information, an amount of credit for use of the battery during charging, customer status (i.e., frequent customer, preferred customer, etc.), customer benefits information such as a discount or points awarded, payment information, battery status, and/or any other information. In addition to the customer, the transaction information can also be provided to the site operator (i.e., the entity that provided the charging service), the owner or operator of fuel cell generator system 100 (if the owner/operator is not the same as the site operator), and/or the vehicle manufacturer.

Any of the components described herein can be implemented in hardware and/or software, depending on the embodiment. Further, any of the control processes and other processes described herein may be implemented as instructions stored in a computer-readable medium. When executed by a processor, the instructions can cause a computing device to implement the processes as described. Exemplary computer-readable media can include magnetic storage devices, optical disks, smart cards, flash memory devices, etc.

The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A charging station comprising:
    a transactional unit configured to receive information regarding an electric vehicle;
    a vehicle interface configured to
        place a battery of the electric vehicle in electrical communication with a fuel cell system; and
        deliver a charge from the fuel cell system to the battery of the electric vehicle; and
    a waste heat unit configured to deliver heat to the electric vehicle during at least a portion of delivery of the charge, wherein the heat comprises waste heat from the fuel cell system comprising at least one of a heated gas or a heated liquid.

2. The charging station of claim 1, further comprising the fuel cell system.

3. The charging station of claim 1, wherein the waste heat is delivered to the electric vehicle based at least in part on a predetermined time at which a driver of the electric vehicle is expected to return to the electric vehicle.

4. The charging station of claim 1, wherein the information includes a temperature rating of the battery, and further wherein the waste heat is delivered to the electric vehicle based at least in part on the temperature rating and at least in part on an ambient temperature.

5. The charging station of claim 1, further comprising a cooling unit configured to cool the battery of the electric vehicle during at least a portion of the delivery of the charge.

6. The charging station of claim 1, wherein the vehicle interface comprises a first winding of a transformer, and further wherein a second winding of the transformer is mounted on the electric vehicle.

7. The charging station of claim 6, wherein the charge is delivered to the battery via inductive coupling between the first winding and the second winding.

8. The charging station of claim 1, wherein the vehicle interface comprises a connector configured to connect to a rectifier mounted to the electric vehicle.

9. The charging station of claim 1, wherein the information includes a destination and a desired time of arrival at the destination, and wherein the charging unit is configured to determine a charging schedule based at least in part on the destination and at least in part on the desired time.

10. The charging station of claim 9, wherein the destination and the desired time of arrival are received from an electronic calendar of a driver of the electric vehicle.

11. The charging station of claim 9, wherein the information further includes a route to the destination, wherein the charging schedule is determined based at least in part on the route, and further wherein the route is received from at least one of mapping software or a mapping website.

12. The charging station of claim 1, wherein the waste heat from the fuel cell system comprises the heated gas.

13. The charging station of claim 12, wherein the heated gas is obtained from an anode or cathode exhaust system of fuel cell system.

14. The charging station of claim 12, wherein the heated gas is obtained from air heated by heat radiated off the fuel cells of fuel cell system.

15. The charging station of claim 12, wherein the waste heat unit further comprises at least one fan or blower configured to provide the waste heat comprising the heated gas to the electric vehicle.

16. The charging station of claim 1, wherein the waste heat from the fuel cell system comprises the heated liquid.

17. The charging station of claim 16, wherein the heated liquid is obtained from a liquid heated by heat radiated off the fuel cells of fuel cell system.

* * * * *